(12) United States Patent
Yun et al.

(10) Patent No.: US 12,291,911 B2
(45) Date of Patent: May 6, 2025

(54) DOOR HINGE DEVICE FOR VEHICLES

(71) Applicants: HYUNDAI MOTOR COMPANY, Seoul (KR); Kia Corporation, Seoul (KR)

(72) Inventors: Hyungin Yun, Seoul (KR); Chungsik Yim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 17/957,009

(22) Filed: Sep. 30, 2022

(65) Prior Publication Data

US 2023/0203867 A1 Jun. 29, 2023

(30) Foreign Application Priority Data

Dec. 27, 2021 (KR) .................. 10-2021-0188086

(51) Int. Cl.
*E05D 15/28* (2006.01)
*B60J 5/04* (2006.01)
*E05D 3/12* (2006.01)

(52) U.S. Cl.
CPC ............ *E05D 15/28* (2013.01); *B60J 5/0479* (2013.01); *E05D 3/127* (2013.01); *E05D 2700/00* (2013.01); *E05Y 2900/531* (2013.01)

(58) Field of Classification Search
CPC . E05D 15/28; E05D 3/127; E05D 3/18; B60J 5/0479; B60J 2005/0475; E05Y 2900/531
See application file for complete search history.

(56) References Cited

U.S. PATENT DOCUMENTS

| 5,896,704 A * | 4/1999 | Neag ................... E05D 15/1081 49/223 |
| 2006/0175867 A1* | 8/2006 | Heuel ...................... E05D 15/58 296/155 |
| 2023/0151662 A1* | 5/2023 | Yun ......................... E05D 15/58 49/394 |

FOREIGN PATENT DOCUMENTS

| KR | 10-2019-0028966 A | 3/2019 | |
| WO | WO-2017187489 A1 * | 11/2017 | ................ B60J 5/00 |

* cited by examiner

*Primary Examiner* — Daniel J Colilla
(74) *Attorney, Agent, or Firm* — MORGAN, LEWIS & BOCKIUS LLP (57) ABSTRACT

In a door hinge device for vehicles, in a vehicle without a B pillar, a hinge slider connected to a hinge portion of a door slidably moves in an external diagonal direction of a vehicle body along a rail in a case to secure a rotational trajectory of the door, and then a first striker configured in the hinge slider is restrained to a hinge latch unit fixed onto the rail inside the case in association with an action of a second striker provided at one side of the door to fix a slide movement location of the hinge slider, stably achieving an opening/closing operation of the door.

11 Claims, 12 Drawing Sheets

DOOR HINGE DEVICE FOR VEHICLES

CROSS-REFERENCE TO RELATED APPLICATION

The present application claims priority to Korean Patent Application No. 10-2021-0188086 filed on Dec. 27, 2021, the entire contents of which is incorporated herein for all purposes by this reference.

BACKGROUND OF THE PRESENT DISCLOSURE

Field of the Present Disclosure

The present disclosure relates to a door hinge device for vehicles, and to a door hinge device for vehicles which secures a rotational trajectory by pushing a hinge portion of a door to the outside of a vehicle body to enable each door to be opened or closed in a vehicle without a B pillar.

Description of Related Art

In general, a vehicular door as a door for distinguishing the inside and the outside of a vehicle plays an important function of blocking external noise, rain, dust, wind, etc., and safely protecting a passenger by absorbing a shock jointly with a side structure during a side collision.

There are various types of vehicular doors including a special-purpose door, but a hinge-type swing door is most frequently applied to a passenger vehicle.

In general, the swing door refers to a door opened to the outside of a vehicle body around a hinge shaft provided through a hinge bracket between the swing door and the vehicle body, and has an advantage in that the swing door is easily opened or closed, a structure is simple, and maintenance is easy Meanwhile, in some vehicles, an opposite swing door is applied in which when the door is opened, an opening feeling is large, and it is advantageous in get-on or off of a passenger.

The opposite swing door includes a type without a B pillar and a type with the B pillar.

Figure 1:
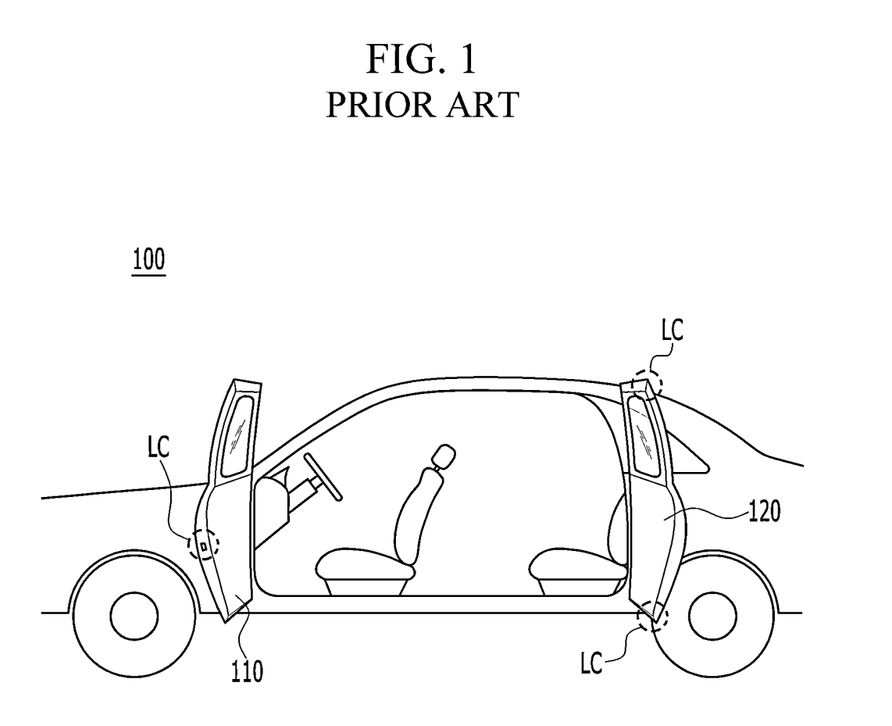
FIG. 1 is a side view exemplarily illustrating a vehicle adopting an opposite-type swing door according to an example of the related art.
Figure 2:
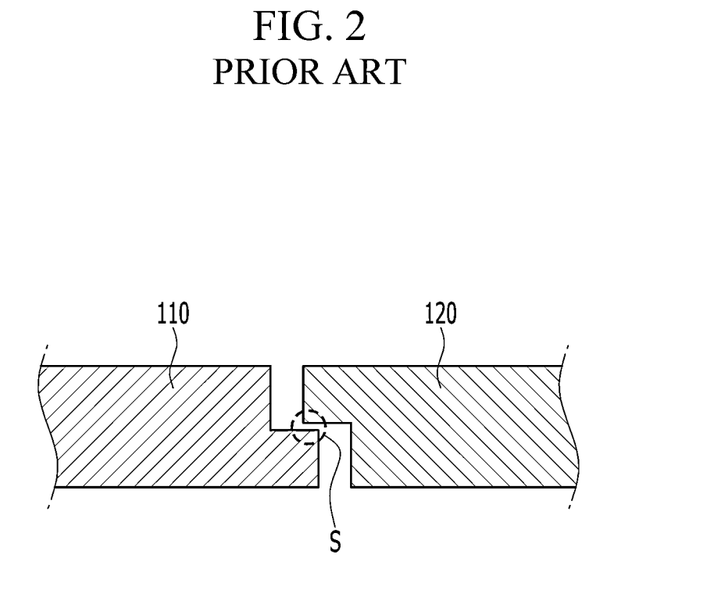
FIG. 2 is a cross-sectional view exemplarily illustrating a portion where a front door and a rear door are in contact with each other in the vehicle of FIG. 1.

FIG. 1 is a side view exemplarily illustrating a vehicle adopting an opposite-type swing door For instance of the related art and FIG. 2 is a cross-sectional view exemplarily illustrating a portion where a front door and a rear door are in contact with each other in the vehicle of FIG. 1.

First, referring to FIG. 1 and FIG. 2, an example of the opposite-type swing door applied to a vehicle 100 without a B pillar is illustrated. In the case of a front door 110, a hinge portion is provided at a front end portion of the front door 110 and in the case of a rear door 120, the hinge portion is provided at a front end portion of the door 120.

In the opposite-type swing door, a latch unit LC for keeping a locking state is provided at one side of the front door 110 or the rear door 120.

Furthermore, a sealing S for airtightness is provided between the rear end portion of the front door 110 and the front end portion of the rear door 120.

Accordingly, in the case of the opposite-type swing door of the vehicle 100 without the B pillar, an opening feeling is excellent during get-on or off of a passenger or a leisure activity, but when the front door 110 and the rear door 120 are opened or closed, there is a disadvantage in that an opening/closing order is predetermined as the front door 110 should be first opened or later closed due to an interference problem in which rotation trajectories of the front door 110 and the rear door 120 overlap.

A such, there is a problem in that the opening/closing order of the front door 110 and the rear door 120 is predetermined, so that the rear door 120 cannot be opened or closed singly.

Figure 3:
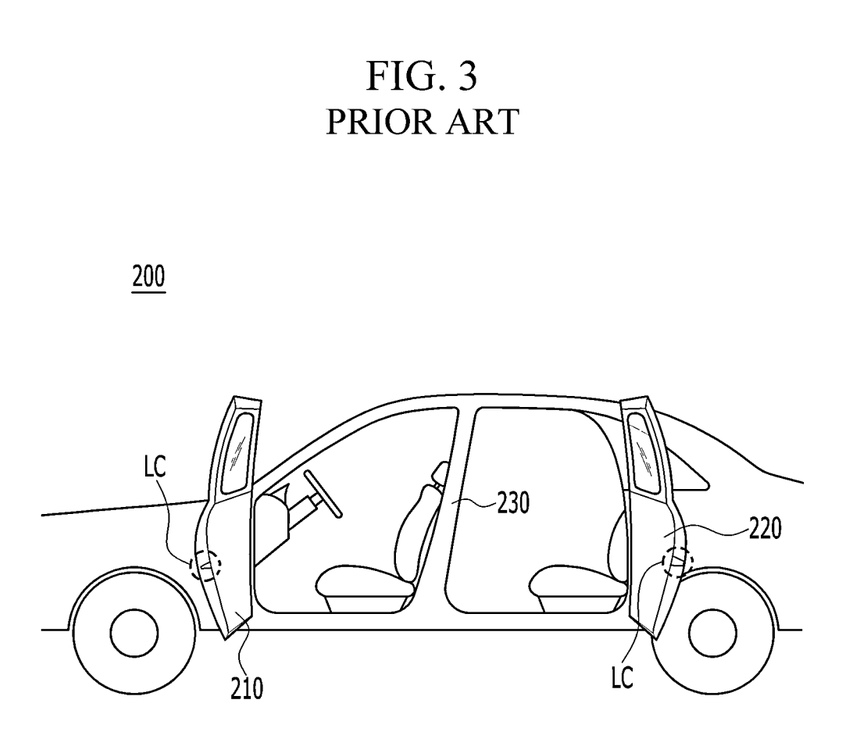
FIG. 3 is a side view exemplarily illustrating a vehicle adopting an opposite-type swing door according to an example of the related art.
Figure 4:
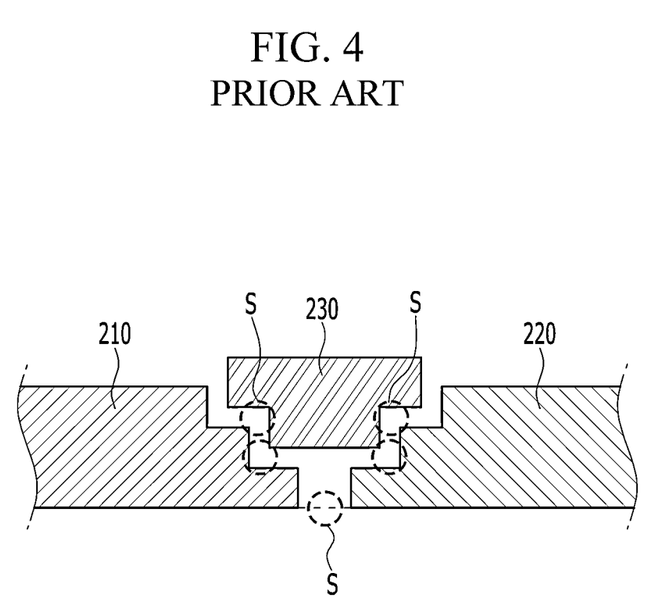
FIG. 4 is a cross-sectional view exemplarily illustrating a portion where a front door and a rear door are in contact with each other in the vehicle of FIG. 3.

FIG. 3 is a side view illustrating a vehicle adopting an opposite-type swing door according to another example of the related art and FIG. 4 is a cross-sectional view illustrating a portion where a front door and a rear door are in contact with each other in the vehicle of FIG. 3.

Referring to FIG. 3 and FIG. 4, an example of the opposite-type swing door applied to a vehicle 200 with the B pillar 230 is illustrated. Furthermore, in the case of a front door 210, a hinge portion is provided at a front end portion of the front door 210 and in the case of a rear door 220, the hinge portion is provided at a rear end portion of the door 220.

In the opposite-type swing door, a latch unit LC for keeping a locking state is provided between one side of each of the front door 210 or the rear door 220, and the B pillar 230.

Furthermore, a sealing S for airtightness is provided between the rear end portion of the front door 210 and the front end portion of the rear door 220 corresponding to the B pillar.

Accordingly, the opposite-type swing door of the vehicle 100 with the B pillar is configured that the front door 210 and the rear door 220 are configured to rotate with reference to the B pillar 2301, so that the opening and closing operations are independently enabled, and as a result, there is an advantage that an operation order is free, but there is a problem in that an opening feeling free deteriorates during get-on or off or a leisure activity by adopting the B pillar 230.

Accordingly, in the case of the opposite-type swing door, according to the B pillar being present, the opening feeling varies, and the opening/closing operations of the front door and the rear door are different from each other.

Meanwhile, as described above, to resolve the problem of the operation order of the front door 110 and the rear door 120 while maintaining the opening feeling of the vehicle 100 without the B pillar, there is an example in which as the door hinge device of the opposite-type swing door, a Guz Neck type hinge device is adopted Generally, but such a Guz Neck type hinge device requires a large free space due to characteristics of the shape, and as a result, it is difficult to configure a layout.

Therefore, to apply the opposite-type swing door to the vehicle without the B pillar, a door hinge device for implementing a new opening/closing structure is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door hinge device for vehicles, in which in a vehicle without a B pillar, a hinge slider connected to a hinge portion of a door slidably moves in an external diagonal direction of a vehicle body along a rail in a case to secure a rotational trajectory of the door, and then a first striker configured in the hinge slider is restrained to a hinge latch unit fixed onto the rail inside the case in association with an action of a second striker provided at one side of the door to fix a slide movement location of the hinge slider, stably achieving an opening/closing operation of the door.

Various aspects of the present disclosure are directed to providing a door hinge device for vehicles including a case provided at one side of a vehicle body corresponding to one end portion of a door in a diagonal direction toward the outside of the vehicle body, rails provided at an upper side and a lower side in the case, respectively in a longitudinal direction, and a hinge slider provided to slidably move along the rails inside the case, and connected to a door hinge bracket fixed to one end portion of the door, which includes: a first striker provided at one side of the hinge slider inside the case; a second striker provided at one side of the door to correspond to an external surface of the external case; and a hinge latch unit including first and second claw levers provided on the rails through two lever shafts, and a pawl lever, and achieved so that the first claw lever restrains or releases the first striker while the second claw lever acts on the pawl lever by the second striker at a location at which the hinge slider slidably moves in an external diagonal direction of the vehicle body.

One end portion of the door may include a front end portion of a front door or a rear end portion of a rear door.

The first striker may be fixed to one side of the hinge slider through a first bracket to be restrained to the first claw lever while the hinge slider slidably moves in the external diagonal direction of the vehicle body.

The second striker may be fixed to one side of the door through a second bracket to act on the second claw lever while the door slidably moves in the external diagonal direction of the vehicle body by the hinge slider.

The hinge latch unit may include first and second lever shafts in which respective upper end portions are fixed through a fixation bracket formed at one side of the upper rail RL1 in upper portion of the inside of the case, and respective lower end portions are connected by a connection bracket, a first claw lever which is rotatably provided at the lower side on the first lever shaft and in which a restraining groove to which the first striker is restrained is formed at a first side thereof and a latching end portion is formed at a second side thereof, a second claw lever which is rotatably provided at the upper side on the first lever shaft, and in which an operation end portion on which the second striker acts is formed at a first side thereof and a rod shape pawl guider is formed at the lower portion of a second side thereof, and a pawl lever which is rotatably provided at one side on the second lever shaft to correspond to the first claw lever, and in which a support end portion which acts on the latching end portion is formed at one side and a guide wall on which the pawl guider acts is formed along the external surface.

Here, in the second claw lever, a guide end portion guiding an entrance of the second striker by extending the fore end portion of the operation end portion in the external diagonal direction of the vehicle body may be further formed.

Furthermore, in the case, perforated acting holes may be formed on the external surface to correspond to the second claw lever and the pawl lever.

Furthermore, the hinge latch unit may further include a first claw spring engaged in the lower portion on the first lever shaft and provided to elastically support the first claw lever in a rotation direction to release restraining of the first striker, a second claw spring engaged in the upper portion on the first lever shaft and provided to elastically support the second claw lever in a rotation direction to release acting of the second striker, and a pawl spring engaged in the lower portion on the second lever shaft and provided to elastically support the pawl lever in a rotation direction in which the support end portion supports the latching end portion of the first claw lever.

The hinge slider may include an upper hinge slider which is slidably connected to the upper rail through a slider inside the case, and in which a fore end portion thereof is hinged to the door hinge bracket through the hinge shaft outside the case through the upper guide slot formed at the upper portion of the external surface of the case, and a lower hinge slider which is slidably connected to the lower rail through the slider inside the case, and the fore end portion thereof is hinged to the door hinge bracket through the hinge shaft outside the case through the lower guide slot formed at the upper portion of the external surface of the case.

Furthermore, the door hinge bracket may include an upper door hinge bracket fixed to the upper side of one end portion of the door and hinged to the fore end portion of the upper hinge slider through the hinge shaft, and a lower door hinge bracket fixed to the lower side of one end portion of the door and hinged to the fore end portion of the lower hinge slider through the hinge shaft.

According to various exemplary embodiments of the present disclosure, in a door hinge device for vehicles, in a vehicle without a B pillar, a hinge slider connected to a hinge portion of a door slidably moves in an external diagonal direction of a vehicle body along a rail in a case to secure a rotational trajectory of the door, and then a first striker configured in the hinge slider is restrained to a hinge latch unit fixed onto the rail inside the case in association with an action of a second striker provided at one side of the door to fix a slide movement location of the hinge slider.

As a result, it is possible to simultaneously to open or close both doors or it is possible to independently to open or close each door.

Furthermore, the hinge portion of the door slidably moves along the hinge slider in the external diagonal direction of the vehicle body, and then a first striker is restrained through a hinge latch unit to keep the slide movement location of the hinge slider in a fixation state, and as a result, the door opening/closing operation may be stably achieved.

Furthermore, a user manually opens or closes the door without a separate driving unit to enable the door opening/closing operation even when a battery is discharged.

Furthermore, according to various exemplary embodiments of the present disclosure, the door hinge device for vehicles has an advantage in that because the door hinge device is slimmer and a free space according to an operation radius is not required, there is a space in configuring a layout of the vehicle body as compared with a case of using the driving unit such as the motor or a Guz Neck type hinge device in the related art.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail with reference to the accompanying drawings.

However, since size and thickness of each component illustrated in the drawings are arbitrarily represented for convenience in explanation, the present disclosure is not particularly limited to the illustrated size and thickness of each component and the thickness is enlarged or reduced, and illustrated in order to clearly express various parts and areas. Furthermore, in order to clearly describe the exemplary embodiment of the present disclosure, parts not related to the description are omitted.

Figure 5:
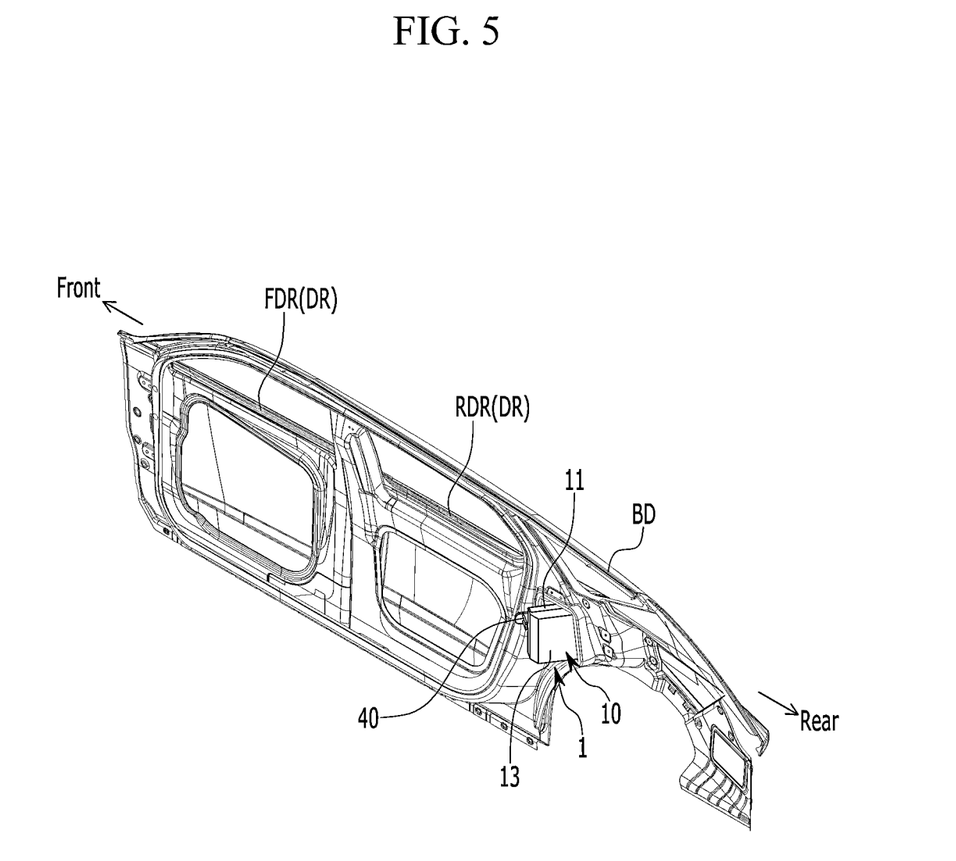
FIG. 5 is an internal perspective view of a vehicular door adopting a door hinge device for vehicles according to various exemplary embodiments of the present disclosure.

In describing the exemplary embodiment of the present disclosure, for convenience of description, the exemplary embodiment of the present disclosure is described by defining an upper left direction of FIG. 5 as a front and a lower right direction as a rear. Furthermore, an example of a door hinge device for vehicles according to various exemplary embodiments of the present disclosure is applied to a rear door of a rear of a passenger seat is described.

Figure 6:
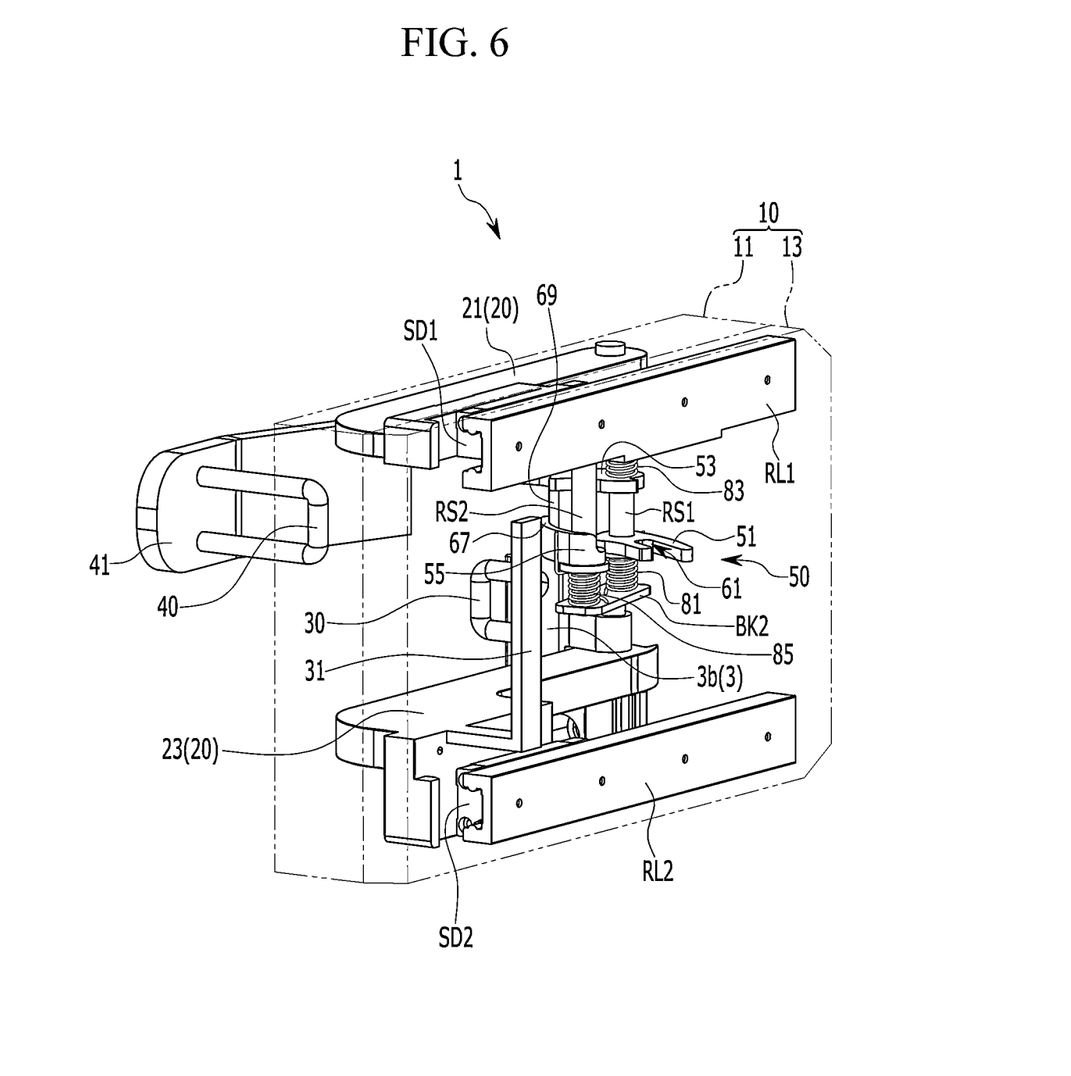
FIG. 6 and FIG. 7 are perspective views exemplarily illustrating a case of the door hinge device for vehicles is projected according to the exemplary embodiment of the present disclosure.
Figure 7:
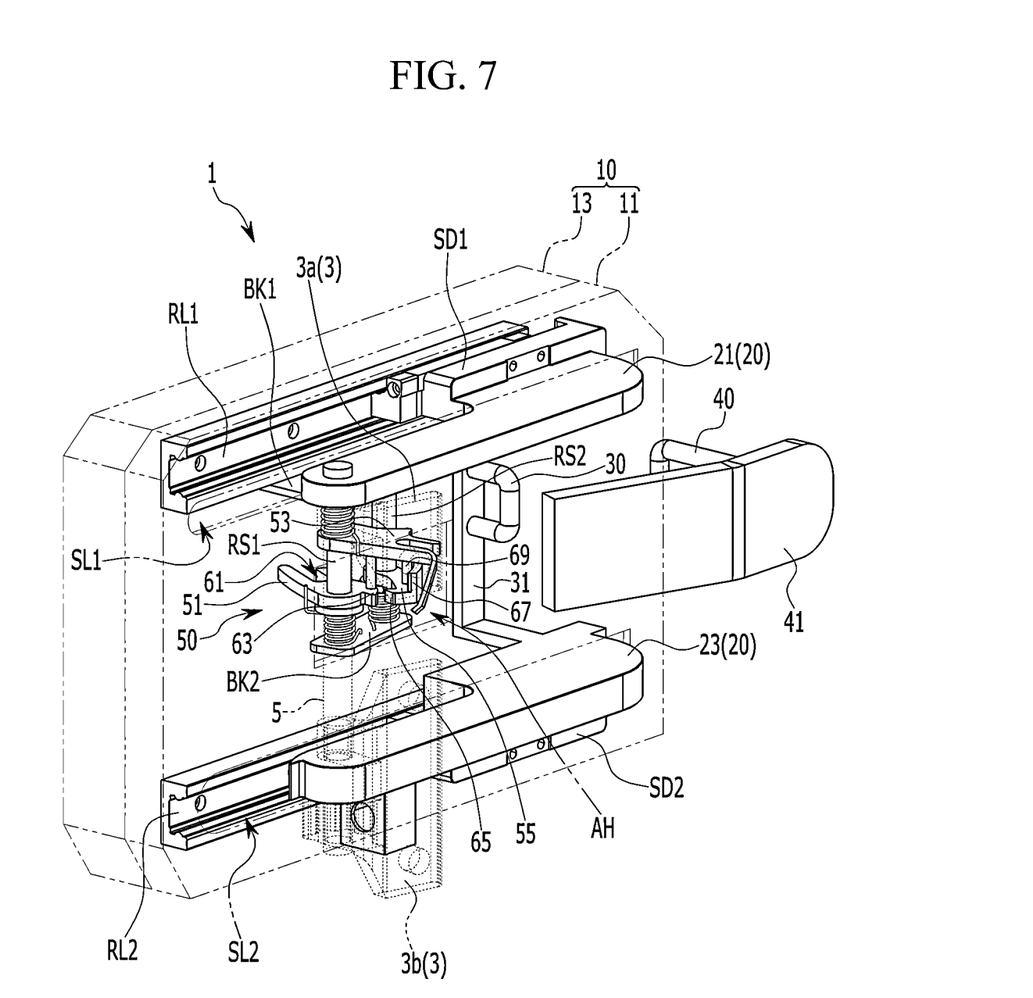
Figure 8:
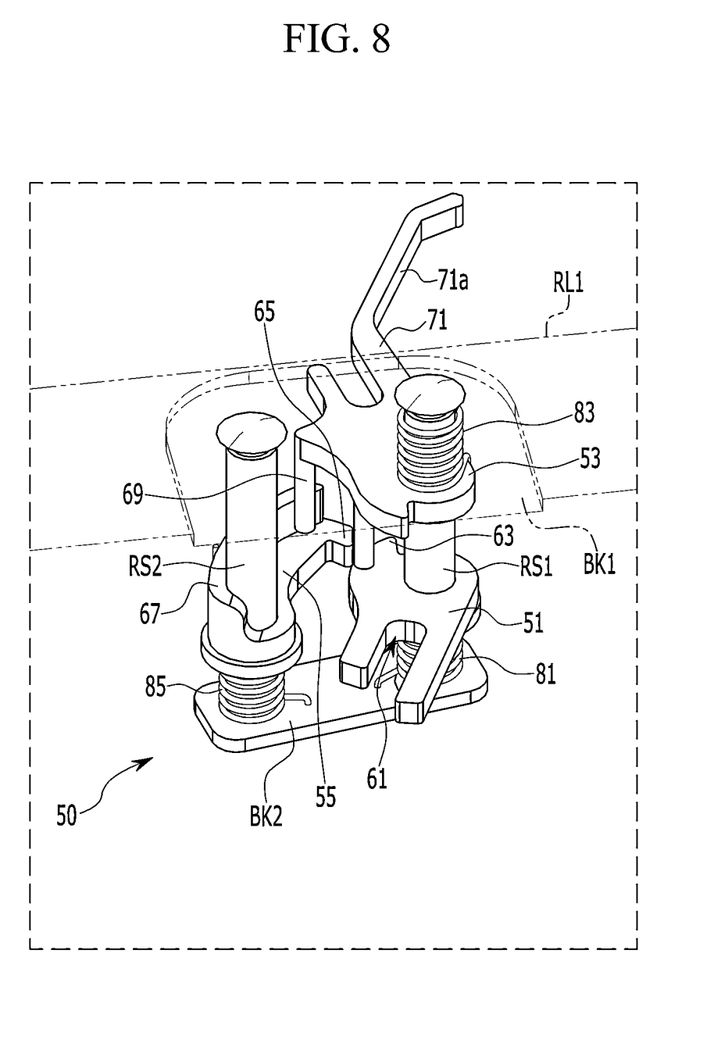
FIG. 8 is a partial perspective view of a hinge latch unit adopting the door hinge device for vehicles according to various exemplary embodiments of the present disclosure.

FIG. 5 is an internal perspective view of a vehicular door adopting a door hinge device for vehicles according to various exemplary embodiments of the present disclosure, FIG. 6 and FIG. 7 are perspective views exemplarily illustrating a case of the door hinge device for vehicles is projected according to the exemplary embodiment of the present disclosure, and FIG. 8 is a partial perspective view of a hinge latch unit adopting the door hinge device for vehicles according to various exemplary embodiments of the present disclosure.

An example in which the door hinge device 1 for vehicles according to the exemplary embodiment of the present disclosure is applied to a rear door in the rear of a passenger seat of a passenger vehicle without a B pillar is described, but the present disclosure is not limited thereto and the door hinge device 1 for vehicles may also be applied between both front doors FDR and a vehicle body BD and between both rear doors RDR and the vehicle body BD of the passenger vehicle without the B pillar.

That is, when the door is opened or closed, while the front door FDR or the rear door PDR moves to the outside of the vehicle body BD in each diagonal direction in the front of the vehicle body BD or in the rear of the vehicle body BD to secure a rotational trajectory of each door, it is possible to simultaneously to open or close both doors or it is possible to open or close one door alone.

Referring to FIGS. 5 to 8, the door hinge device 1 for vehicles according to the exemplary embodiment of the present disclosure may include a case 10, a hinge slider 20, first and second strikers 30 and 40, and a hinge latch unit 50.

The case 10 is provided at one side of the vehicle body BD corresponding to one end portion of the door DR in a diagonal direction toward the outside of the vehicle body.

Here, the door DR may be the front door FDR or the rear door RDR, and may also refer to the front door FDR and the rear door RDR. That is, when the door DR is the front door FDR, one end portion may be one side the front end portion of the front door FDR and when the door DR is the rear door RDR, one end portion may be one side of the rear end portion of the rear door RDR.

Furthermore, one side of the vehicle body BD where the front door FDR is provided may mean one side the front of the vehicle body BD, and in the instant case, the front door FDR may be provided in the diagonal direction toward the outside of the front of the vehicle body BD.

Furthermore, one side of the vehicle body BD where the rear door RDR is provided may mean one side the rear of the vehicle body BD, and in the instant case, the rear door RDR may be provided in the diagonal direction toward the outside of the rear of the vehicle body BD.

Furthermore, two guide slots SL1 and SL2 are formed on an external surface of the case 10, and an upper rail RL1 and a lower rail RL2 are provided at an upper side and a lower side in the case, respectively in a longitudinal direction thereof.

That is, the case 10 is configured by assembling an external case 11 and an internal case 13 to each other.

The external case 11 faces the outside of the vehicle body BD, and is cut into an upper portion and a lower portion on a cross section, respectively in the longitudinal direction, and the upper guide slot SL1 and the lower guide slot SL2 are in parallel to each other.

The internal case 13 faces the interior of the vehicle body BD, and is assembled to the external case 11.

Furthermore, the upper rail SL1 is disposed inside the external case 11 and the internal case 13 in the longitudinal direction, and fixed to the upper side of the internal surface of the internal case 13, and the lower rail SL2 is disposed in parallel to the upper rail RL1 inside the external case 11 and the internal case 13 and fixed to a lower side of the internal surface of the internal case 13.

Furthermore, the hinge slider 20 is provided inside a space between the external case 11 and the internal case 13 through the upper rail RL1 and the lower rail RL2, and the hinge latch unit 50 is provided in the upper rail RL1 inside the space between the external case 11 and the internal case 13.

The hinge slider 20 is provided to slidably move along the upper rail RL1 and the lower rail RL2 through two sliders SD1 and SD2 inside the case 10, and connected to a door hinge bracket 3 fixed to one end portion of the door DR through a hinge shaft 5 outside the case 10 through two guide slots SL1 and SL2.

That is, the hinge slider 20 includes an upper hinge slider 21 and a lower hinge slider 23 provided through the slots SL1 and SL2 formed in the upper portion and the lower portion of the external case 11.

The upper hinge slider 21 is slidably connected to the upper rail RL1 through the slider SD1 inside the case 10, and a fore end portion is hinged to the door hinge bracket 3 through the hinge shaft 5 outside the external case 11 through the upper guide slot SL1 formed at the upper portion of the external surface of the external case 11.

Furthermore, the lower hinge slider 23 is slidably connected to the lower rail RL2 through the slider SD2 inside the case 10, and the fore end portion is hinged to the door hinge bracket 3 through the hinge shaft 5 outside the external case 11 through the lower guide slot SL2 formed at the upper portion of the external surface of the external case 11.

Here, the first striker 30 is fixed to one side of the lower hinge slider 23 through the first bracket 31.

Furthermore, the door hinge bracket 3 includes an upper door hinge bracket 3a and a lower door hinge bracket 3b.

That is, the upper door hinge bracket 3a is fixed to the upper side of one end portion of the door DR and hinged to the fore end portion of the upper hinge slider 21 through the hinge shaft 5.

Furthermore, the lower door hinge bracket 3b is fixed to the lower side of one end portion of the door DR and hinged to the fore end portion of the lower hinge slider 23 through the hinge shaft 5.

Furthermore, the first striker 30 is provided at one side of the lower hinge slider 23 among the hinge sliders 20 inside the case 10.

That is, the first striker 30 is fixed to one side of the lower hinge slider 23 through the first bracket 31 to be restrained to a first claw lever 51 provided in the hinge latch unit 50 while the hinge slider 20 slidably moves in the external diagonal direction of the vehicle body.

Furthermore, a second striker 40 is provided at one side of the door DR to correspond to the external surface of the external case 11.

That is, the second striker 40 is fixed to one side of the door DR through the second bracket 41 to act on a second claw lever 53 provided in the hinge latch unit 50 while the doors DR slidably moves in the external diagonal direction of the vehicle body by the hinge slider 20.

Referring to FIG. 8, the hinge latch unit 50 includes first and second claw levers 51 and 53 provided on the upper rail RL1 through a first lever shaft RS1 and a pawl lever 55 provided through a second lever shaft RS2, and is achieved so that the first claw lever 51 restrains or releases the first striker 30 while the second claw lever 53 acts on the pawl lever 55 by the second striker 40 at a location at which the hinge slider 20 slidably moves in the external diagonal direction of the vehicle body.

That is, the hinge latch unit 50 includes the first and second lever shafts RS1 and RS2, the first and second claw levers 51 and 53, and the pawl lever 55.

Respective upper end portions of the first and second lever shafts RS1 and RS2 are fixed to a fixation bracket BK1 formed at one side of the upper rail RL1 to be adjacent in parallel to each other in upper portion of the inside of the case 10.

Furthermore, a lower end portion of each of the first and second lever shafts RS1 and RS2 is fixed through a connection bracket BK2.

The first claw lever 51 is rotatably provided at the lower side on the first lever shaft RS1. Furthermore, a restraining groove 61 to which the first striker 30 is restrained is formed at one side and a latching end portion 63 is formed at the other side thereof.

The second claw lever 53 is rotatably provided at the upper side on the first lever shaft RS1. Furthermore, an operation end portion 71 on which the second striker 40 acts is formed at one side and a rod shape pawl guider 69 is formed at the lower portion of the other side thereof.

Here, the operation end portion 71 includes a guide end portion 71a achieved by extending the fore end portion in the external diagonal direction of the vehicle body, and the guide end portion 71a guides entrance of the second striker 40 to derive the second striker 40 to act on the operation end portion 71 when the door DR is closed.

The pawl lever 55 is rotatably provided at one side on the second lever shaft RS2 to correspond to the first claw lever 51. Furthermore, a support end portion 65 which acts on the latching end portion 63 is formed at one side and a guide wall 67 on which the pawl guider 69 acts is formed along the external surface.

Here, for the second claw lever 53 provided inside the case 10 to be operated by the second striker 40 outside the case 10, perforated acting holes AH are formed on the external surface of the external case 11 to correspond to the second claw lever 53 and the pawl lever 55.

The hinge latch unit 50 further includes first and second springs 81 and 83, and a pawl spring 85.

The first claw spring 81 is engaged in the lower portion on the first lever shaft RS1 and provided to elastically support the first claw lever 51 in a rotation direction to release restraining of the first striker 30.

The second claw spring 83 is engaged in the upper portion on the first lever shaft RS1 and provided to elastically support the second claw lever 53 in a rotation direction to release acting of the second striker 40.

Furthermore, the pawl spring 85 is engaged in the lower portion on the second lever shaft RS2 and provided to elastically support the pawl lever 55 in a rotation direction in which the support end portion 65 supports the latching end portion 63 of the first claw lever 51.

Hereinafter, a specific operation of the door hinge device for vehicles according to the exemplary embodiment of the present disclosure will be described with reference to FIG. 9, FIG. 10, FIG. 11 and FIG. 12.

FIG. 9, FIG. 10, FIG. 11 and FIG. 12 are plan cross-sectional views exemplarily illustrating an operation state for each step of the door hinge device for vehicles according to the exemplary embodiment of the present disclosure.

Figure 9:
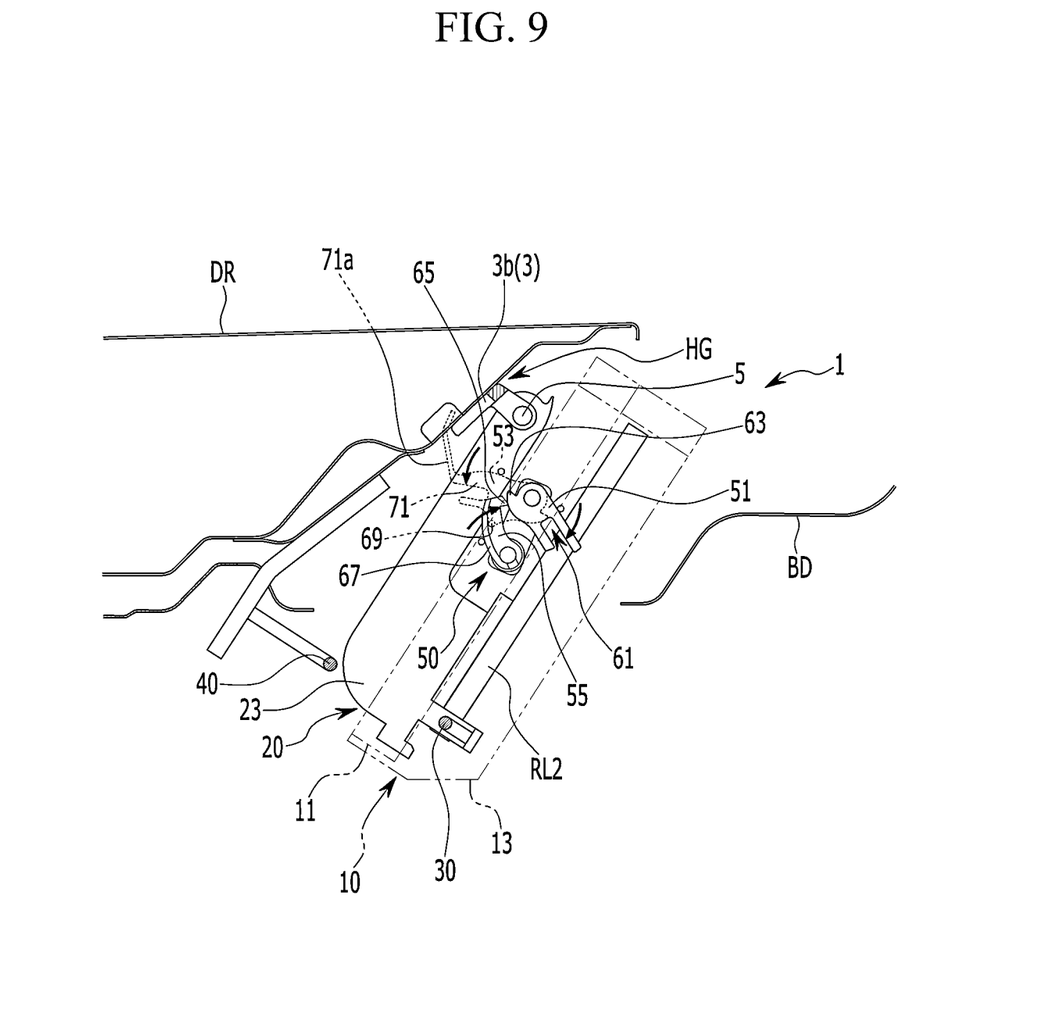
FIG. 9, FIG. 10, FIG. 11 and FIG. 12 are plan cross-sectional views exemplarily illustrating an operation state for each step of the door hinge device for vehicles according to the exemplary embodiment of the present disclosure.

First, referring to FIG. 9, the door DR is in a closed state.

In the instant case, while the hinge shaft 5 connecting the door DR and the vehicle body BD moves in an internal diagonal direction of the vehicle body BD jointly with the hinge slider 20, one end portion of the door DR is a location where the door DR maintains the closed state.

In the instant case, the hinge latch unit 50 is a state in which the support end portion 65 of the pawl lever 55 is separated from the latching end portion 63 of the first claw lever 51, and the first claw lever 51 rotates by the first claw spring 81 to allow the restraining groove 61 of the first claw lever 51 to be opened to enable the first striker 30 to enter.

Furthermore, the second claw lever 53 is rotated by the second claw spring 83 so that the second striker 40 is located at a distance from second claw lever 53 and does not contact the second claw lever 53.

Figure 10:
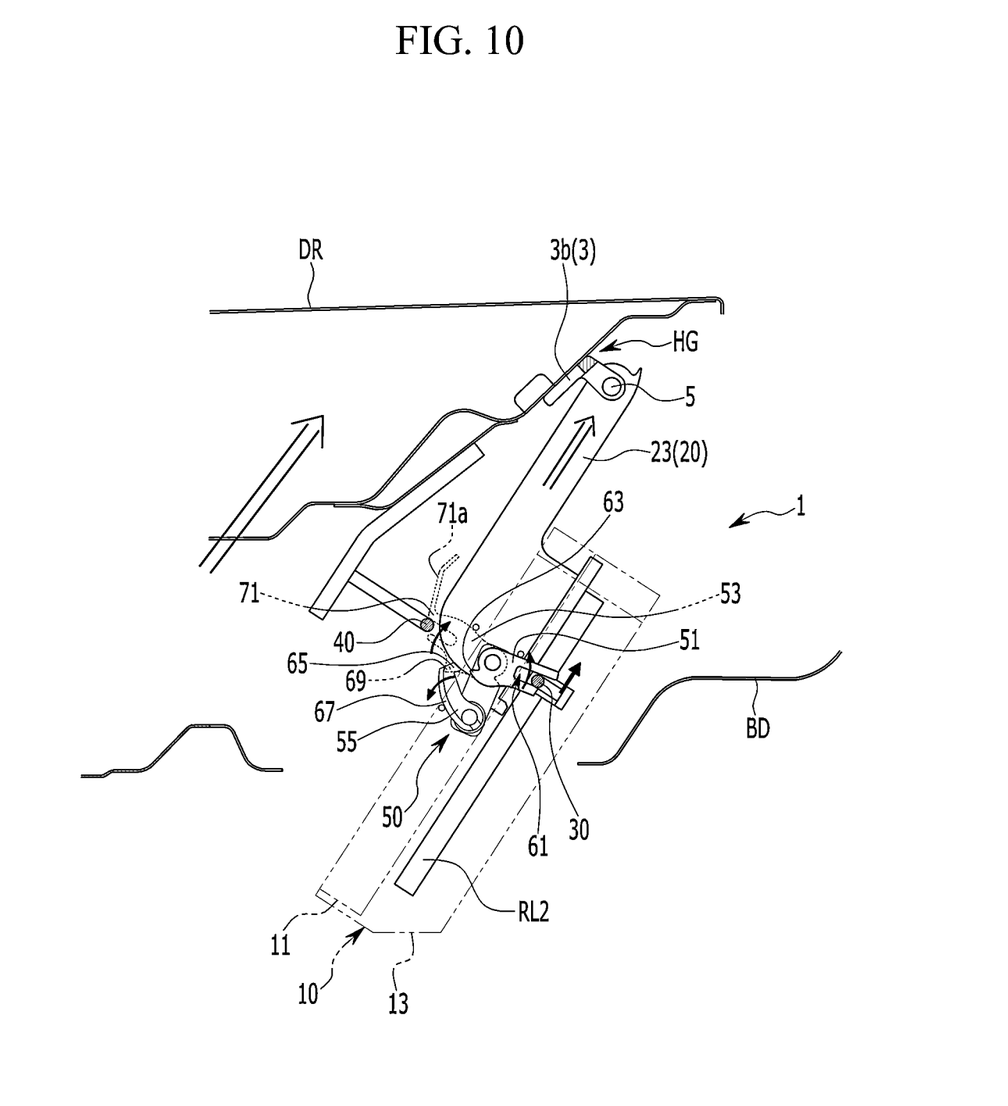

Referring to FIG. 10, as described above, while the door DR is closed, when a user slidably operates the door DR to open the door DR, a hinge portion HG of the door DR moves in the external diagonal direction of the vehicle body BD.

Accordingly, the hinge slider 20 connected to the door hinge bracket 3 through the hinge shaft 5 slidably moves in the external diagonal direction of the vehicle body BD along the upper and lower rails RL1 and RL2.

In the instant case, while the first striker 30 pushes and rotates one side of the restraining groove 61 of the first claw lever 51, the hinge latch unit 50 is restrained to the restraining groove 61.

Furthermore, the second striker 40 pushes and rotates the operation end portion 71 of the second claw lever 53. In the instant case, the pawl guider 69 of the second claw lever 53 suppress the rotation of the pawl lever 55 by the pawl spring 85 while the pawl guider 69 moves along the inside surface of the guide wall 67 on the pawl lever 55.

Figure 11:
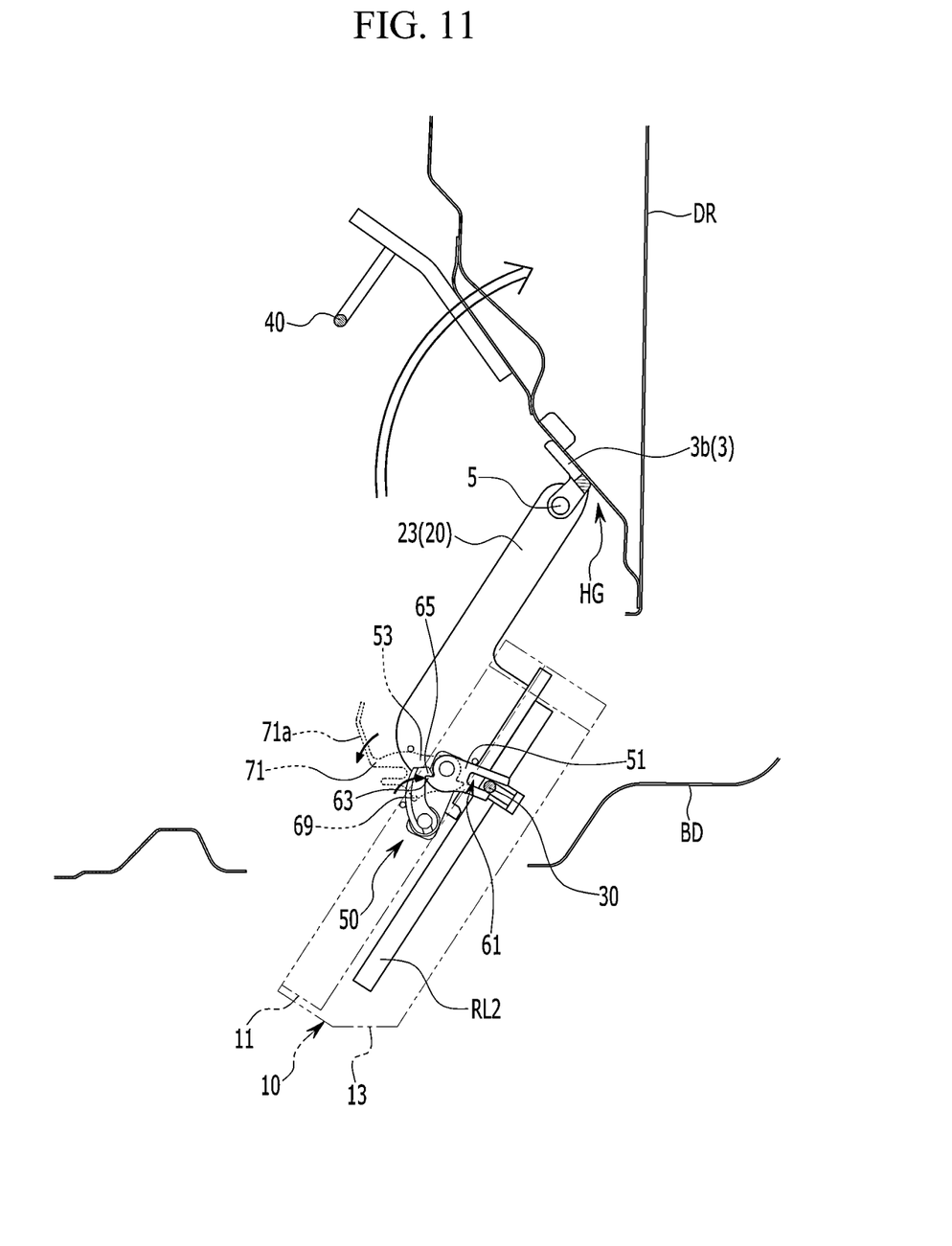

Referring to FIG. 11, accordingly, after the sliding operation of the door DR is completed, the user swings the door DR to open the door DR.

Accordingly, the door DR rotates on the hinge shaft 5 as a rotation center.

In the instant case, in the hinge latch unit 50, the second striker 40 is separated from the operation end portion 71 of the second claw lever 53 in the external direction of the vehicle body jointly with the swing operation of the door DR, and the second claw lever 53 rotates reversely by the second claw spring 83.

As a result, the pawl guider 69 of the second claw lever 53 moves to the inside of the guide wall 67 on the pawl lever 55, and the pawl lever 55 rotates by the pawl spring 85 and while the support end portion 65 is latched to the latching end portion 63 of the first claw lever 51, the support end portion 65 supports the first claw lever 51 not to rotate reversely.

Accordingly, the first striker 30 is kept to be restrained to the restraining groove 61 of the first claw lever 51, and the door DR is fixed while the hinge portion HG with the vehicle body BD slidably moves in the external diagonal direction of the vehicle body BD and the rotational trajectory of the door DR is secured without interference with the vehicle body BD or another door DR, and the swing operation of the door DR may be stably achieved by the user.

Figure 12:
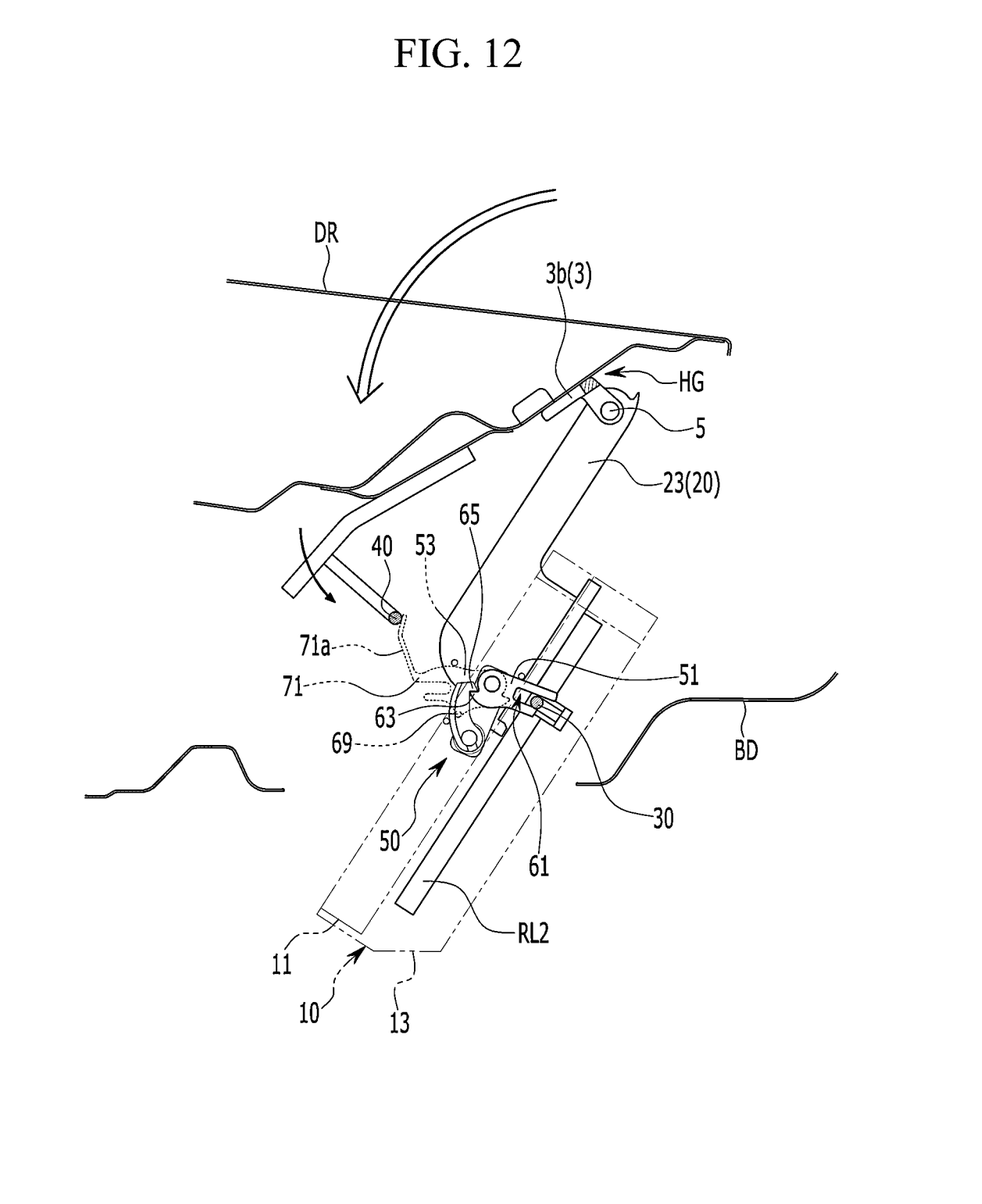

Meanwhile, referring to FIG. 12, accordingly, when the door DR is closed again while the door DR is fully opened, the door DR is closed through the swing operation and the slide moving operation with the hinge shaft R as the rotation center.

Here, in closing the door DR, the swing operation is performed reversely to opening the door DR, and then the door DR slidably moves to the internal diagonal direction of the vehicle body BD again to close the door DR.

In the instant case, to fully close the door DR, the state in which the first striker 30 is restrained to the restraining groove 61 of the first claw lever 51 may be released before slidable moving.

To the present end, in the process in which the swing operation is performed in a direction in which the door DR is closed, the second striker 40 fixed to the door DR enters the guide end portion 71a of the second claw lever 53.

Accordingly, while the second striker 40 is guided by the guide end portion 71a, the second striker 40 pushes and rotates the second claw lever 53 in the external diagonal direction of the vehicle body BD and moves up to the operation end portion 71.

In the instant case, referring back to FIG. 10, in the second claw lever 53, while the pawl guider 69 moves along the inside surface of the guide wall 67 on the pawl lever 55, the pawl lever 55 rotates by overcoming elastic force the pawl spring 85 and the support end portion 65 of the pawl lever 55 is thus separated from the latching end portion 63 of the first claw lever 51.

In such a state, in the first claw lever 51, a support state of the latching end portion 63 by the support end portion 65 is rotatable, but the door DR does not slidably move, and as a result, the first striker 30 maintains a location in which the first striker 30 is restrained to the restraining groove 61 of the first claw lever 51 according to the location of the door DR.

Subsequently, while the user slidably moves the door DR in the internal diagonal direction of the vehicle body BD, the hinge slider 20 moves in the internal diagonal direction of the vehicle body BD along the upper rail RL1 and the lower rail RL2, and the first striker 30 is separated from the restraining groove 61 of the first claw lever 51, and as a result, the door DR is closed.

Accordingly, in the door hinge device 1 for vehicles according to the exemplary embodiment of the present disclosure, in the vehicle without the B pillar, the hinge slider 20 connected to the hinge portion HG of the door DR slidably moves in the external diagonal direction of the vehicle body BD along the upper and lower rails RL1 and RL2 in the case 10 to secure the rotational trajectory of the door DR.

In the instant case, the first striker 30 fixed to the hinge slider 20 is restrained to the restraining groove 61 of the first claw lever 51 on the hinge latch unit 50 fixed onto the upper rail RL1 inside the case 10 in association with the action of the second striker 40 fixed to one side of the door DR to fix the slide movement location of the hinge slider 20, simultaneously opening/closing both doors DR and independently opening/closing only one door DR.

Furthermore, the hinge portion HG of the door DR slidably moves along the hinge slider 20 in the external diagonal direction of the vehicle body BD, and then the first striker 30 is restrained through the first claw lever 51 on the hinge latch unit 50 to keep the slide movement location of the hinge slider 20 in a fixation state, and as a result, the door opening/closing operation may be stably achieved.

Furthermore, the user manually opens or closes the door DR without a separate driving unit to enable the door opening/closing operation even when a battery is discharged.

Furthermore, according to the exemplary embodiment of the present disclosure, the door hinge device 1 for vehicles has an advantage in that because the door hinge device is slimmer and a free space according to an operation radius is not required, there is a space in configuring a layout of the vehicle body as compared with a case of using the driving unit such as the motor or a Guz Neck type hinge device in the related art.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for vehicles including a case provided at one side of a vehicle body corresponding to one end portion of a door in a diagonal direction toward the outside of the vehicle body, rails provided at an upper side and a lower side in the case, respectively in a longitudinal direction, and a hinge slider provided to slidably move along the rails inside the case including an external case, and connected to a door hinge bracket fixed to the one end portion of the door, the door hinge apparatus comprising:
   a first striker provided at one side of the hinge slider inside the case;
   a second striker provided at one side of the door to correspond to an external surface of the external case; and
   a hinge latch unit including first and second claw levers provided on the rails through two lever shafts, and a pawl lever, and achieved so that the first claw lever restrains or releases the first striker while the second claw lever acts on the pawl lever by the second striker at a location at which the hinge slider slidably moves in an external diagonal direction of the vehicle body.

2. The door hinge apparatus of claim 1, wherein the one end portion of the door includes a front end portion of a front door or a rear end portion of a rear door.

3. The door hinge apparatus of claim 1, wherein the first striker is fixed to one side of the hinge slider through a first bracket to be restrained to the first claw lever while the hinge slider slidably moves in the external diagonal direction of the vehicle body.

4. The door hinge apparatus of claim 1, wherein the second striker is fixed to one side of the door through a second bracket to act on the second claw lever while the door slidably moves in the external diagonal direction of the vehicle body by the hinge slider.

5. The door hinge apparatus of claim 1,
   wherein the rails include an upper rail and the two lever shafts include first and second lever shafts and
   wherein the hinge latch unit includes:
      the first and second lever shafts in which respective upper end portions are fixed through a fixation bracket formed at one side of the upper rail in upper portion of the inside of the case, and respective lower end portions are connected by a connection bracket;
      the first claw lever which is rotatably provided at the lower side on the first lever shaft and in which a restraining groove to which the first striker is restrained is formed at a first side thereof and a latching end portion is formed at a second side thereof;
      the second claw lever which is rotatably provided at the upper side on the first lever shaft, and in which an operation end portion on which the second striker acts is formed at a first side thereof and a pawl guider is formed at a lower portion of a second side thereof; and
      a pawl lever which is rotatably provided at one side on the second lever shaft to correspond to the first claw lever, and in which a support end portion which acts on the latching end portion is formed at one side and a guide wall on which the pawl guider acts is formed along the external surface.

6. The door hinge apparatus of claim 5, wherein the second claw lever further includes a guide end portion guiding an entrance of the second striker by extending a fore end portion of the operation end portion in the external diagonal direction of the vehicle body.

7. The door hinge apparatus of claim 5, wherein the case includes perforated acting holes formed on the external surface to correspond to the second claw lever and the pawl lever.

8. The door hinge apparatus of claim 5, wherein the hinge latch unit further includes
   a first claw spring engaged in the lower portion on the first lever shaft and provided to elastically support the first claw lever in a rotation direction to release restraining of the first striker,
   a second claw spring engaged in the upper portion on the first lever shaft and provided to elastically support the second claw lever in a rotation direction to release acting of the second striker, and
   a pawl spring engaged in the lower portion on the second lever shaft and provided to elastically support the pawl lever in a rotation direction in which the support end portion supports the latching end portion of the first claw lever.

9. The door hinge apparatus of claim 1,
   wherein the rails include an upper rail and a lower rail, and
   wherein the hinge slider includes:
      an upper hinge slider which is slidably connected to the upper rail through a slider inside the case, and in which a fore end portion thereof is hinged to the door hinge bracket through a hinge shaft outside the case through an upper guide slot formed at an upper portion of the external surface of the case, and
      a lower hinge slider which is slidably connected to the lower rail through the slider inside the case, and the fore end portion is hinged to the door hinge bracket through the hinge shaft outside the case through a lower guide slot formed at the upper portion of the external surface of the case.

10. The door hinge apparatus of claim 9, wherein the door hinge bracket includes:

an upper door hinge bracket fixed to an upper side of the one end portion of the door and hinged to the fore end portion of the upper hinge slider through the hinge shaft; and a lower door hinge bracket fixed to a lower side of the one end portion of the door and hinged to the fore end portion of the lower hinge slider through the hinge shaft.

11. A door hinge apparatus for vehicles, the door hinge apparatus comprising:
- a case provided at one side of a vehicle body corresponding to one end portion of a door in a diagonal direction toward the outside of the vehicle body and including an internal case and an external case;
- rails provided at an upper side and a lower side in the case, respectively in a longitudinal direction;
- a hinge slider provided to slidably move along the rails inside the case, and connected to a door hinge bracket fixed to the one end portion of the door;
- a first striker provided at one side of the hinge slider inside the case;
- a second striker provided at one side of the door to correspond to an external surface of the external case; and
- a hinge latch unit including first and second claw levers provided on the rails through first and second lever shafts, and a pawl lever, and achieved so that the first claw lever restrains or releases the first striker while the second claw lever acts on the pawl lever by the second striker at a location at which the hinge slider slidably moves in an external diagonal direction of the vehicle body.

* * * * *